(12) United States Patent
Takatsuka et al.

(10) Patent No.: US 8,072,425 B2
(45) Date of Patent: Dec. 6, 2011

(54) KEY SHEET FOR A POINTING DEVICE AND POINTING DEVICE

(75) Inventors: Toshinori Takatsuka, Fuji (JP); Yoshifumi Honmatsu, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 1532 days.

(21) Appl. No.: 11/441,046

(22) Filed: May 26, 2006

(65) Prior Publication Data

US 2006/0267937 A1 Nov. 30, 2006

(30) Foreign Application Priority Data

May 30, 2005 (JP) .................................. 2005-157710
Mar. 17, 2006 (JP) .................................. 2006-075147

(51) Int. Cl.
*G09G 5/08* (2006.01)
(52) U.S. Cl. ........................................ 345/160; 345/156
(58) Field of Classification Search .......... 345/156–160; 715/856–862

See application file for complete search history.

(56) References Cited

U.S. PATENT DOCUMENTS 7,633,488 B2 * 12/2009 Nishino et al. ................. 345/157

FOREIGN PATENT DOCUMENTS

| JP | 2000-235822 | 8/2000 |
|---|---|---|
| JP | 2002-150904 | 5/2002 |
| JP | 2004-031177 A | 1/2004 |
| JP | 2004-062447 | 2/2004 |
| JP | 2004-288459 A | 10/2004 |

* cited by examiner

Primary Examiner — Alexander Eisen
Assistant Examiner — Christopher E Leiby
(74) Attorney, Agent, or Firm — Cermak Nakajima LLP; Tomoko Nakajima

(57) ABSTRACT

Disclosed are a key sheet for a pointing device and a pointing device using a magnet compact in terms of both magnetic force and size to allow a reduction in thickness. Between a pusher (14*f*) opposed to a contact input portion (E) of a board (P) and a magnet (11) fixed to a base sheet (14) at an outside position around the pusher (14*f*) as a center so as to be away from a key top (15), there is provided an elastic flexible portion (14*d*) allowing displacement in a depressing direction through depression of the key top (15) toward the contact input portion (E). As a result, it is possible to perform depressing operation on the key top (15), with the magnet (11) being provided on the base sheet (14), making it possible to perform switch input, such as confirmation input.

24 Claims, 13 Drawing Sheets

KEY SHEET FOR A POINTING DEVICE AND POINTING DEVICE

BACKGROUND OF THE INVENTION

1. Field of the Invention

The present invention relates to a pointing device utilized as an operating device for an electronic apparatus such as a mobile phone, a PDA, or a game controller, and to a key sheet for the pointing device. In particular, the present invention relates to a magnetic detection type pointing device which detects a change in magnetic flux density resulting from movements of a magnet, and to a key sheet for the pointing device.

2. Description of the Related Art

Nowadays, operating devices of electronic apparatuses and input systems thereof have been diversified. In this context, a magnetic detection type pointing device is known, in which a change in magnetic flux density due to "sidewise movement" of a magnet, such as tilting or horizontal displacement of the magnet, is detected by a magnetic sensor, and in which the change thus detected is utilized as an input signal. This technique is disclosed, for example, in JP 2000-235822 A, JP 2004-62447 A, and JP 2002-150904 A. In those pointing devices, a magnet is integrally accommodated in a key top to be depressed, and is moved through operation of the key top, with the movement amount of the magnet being detected by a magnetic sensor provided on a board.

In such magnetic detection type pointing devices, in which the magnet moves, there is provided some contrivance in terms of arrangement to prevent the magnet and the magnetic sensor from coming into contact with each other. For example, in the pointing devices as disclosed in JP 2000-235822 A and JP 2004-62447 A, the magnetic sensor is mounted on a back surface of the board, and even if the key top moves on the board, it does not come into contact with the magnetic sensor. However, when the magnetic sensor is provided on the back surface of the board, a distance between the magnetic sensor and the magnet is larger than in the case in which the magnetic sensor is provided on a front surface of the board, so it is necessary to use a powerful magnet. Further, it is necessary to provide a mounting space for the magnetic sensor on the back surface of the board, with the result that a thickness of the pointing device becomes rather large.

In contrast, in the technique as disclosed in JP 2002-150904 A, the magnetic sensor is mounted on the front surface of the board, so the distance between the magnetic sensor and the magnet is shorter as compared with the case in which the magnetic sensor is mounted on the back surface of the board. However, the magnet is provided inside the key top for input operation, so it is all the same necessary to use a powerful magnet, and the thickness of the magnet cannot help but be rather large. As a result, peripheral members are adversely affected by a strong magnetic field generated, and the thickness of the key top cannot be reduced due to the thickness of the magnet.

SUMMARY OF THE INVENTION

The present invention has been made in view of the above problems in the prior art. The present invention may provide a key sheet for a pointing device and a pointing device using a magnet as compact as possible in terms of both magnetic force and size and allowing a reduction in thickness.

To achieve the above object, the present invention may provide a key sheet for a pointing device, including: a key top; a support member having a front surface constituting an operation surface to which the key top is firmly attached, and a back surface, which is on a reverse side of the front surface, having a pusher for depressing a contact input portion on a board opposed to the back surface; a magnet fixed to the support member at a position sidewise with respect to the pusher and around the pusher as a center, in which when the key top is moved sidewise, the magnet moves synchronously, with a change in magnetic flux density due to the sidewise movement of the magnet being detected by magnetic sensors provided on the board, and an elastic flexible portion allowing displacement in a depressing direction through depression of the key top toward the contact input portion is provided between the magnet and the pusher.

The magnet is fixed to the support member so as to be spaced apart from the key top, so it is possible to reduce the distance between the magnetic sensor arranged, for example, on the board and the magnet. Thus, as compared with the conventional techniques in which this distance is rather large, it is possible to apply a magnet with a smaller magnetic flux density, thus making it possible to make the pointing device compact in size. Further, since the magnet is fixed to the support member, a larger space is available for the arrangement of the magnet as compared with the conventional techniques in which the magnet is accommodated in the key top, making it possible to use a sufficiently large magnet meeting the requirement in terms of performance.

Further, the elastic flexible portion between the magnet and the pusher may allow displacement in the depressing direction through depression of the key top toward the contact input portion, so even in the case of a construction in which the magnet is provided on the support member, the magnet does not constitute an obstacle at the time of depressing operation. Thus, it is possible to perform the depressing operation on the key top, making it possible to effect switch input, such as confirmation input. Thus, it is possible to obtain a key sheet for a pointing device in which not only is it possible to obtain positional information based on a sidewise moving direction but also it is possible to effect switch input.

In the present invention, the elastic flexible portion may be formed of a rubber-like elastic material. A rubber-like elastic material is expandable, and the elastic flexible portion may expand in the depressing direction of the key top to thereby allow displacement of the key top, making it possible to perform the depressing operation regardless of the arrangement of the magnet provided on the support member. When the depressing operation is stopped, the elastic flexible portion is restored to the former state by the resilient force of the rubber-like elastic material.

The present invention may provide a flange portion, in which the elastic flexible portion protrudes from a side surface of the key top in the sidewise moving direction thereof.

With the formation of the elastic flexible portion as a flange portion, when the elastic flexible portion is engaged with an inner surface of another member, such as a casing of an electronic apparatus, it is possible to prevent the key top that is removed from the support member from being detached from the electronic apparatus.

Further, since the elastic flexible portion is formed as a flange portion, even if the key top has a flange portion on the side surface thereof, the flange portion does not constitute an obstacle at the time of depressing operation. Thus, the key top can be depressed, and it is possible to effect switch input, such as confirmation input. Thus, it is possible to provide a key sheet for a pointing device in which not only is it possible to obtain positional information based on the sidewise moving direction, but also it is possible to effect switch input.

According to the present invention, it is possible to form the flange portion of a resin film which is a component separate from the key top. For example, it is possible to combine a key top formed of a hard material with a flange portion composed of a resin film constituting a separate component. By thus firming the key top of a hard material, an interference of the depression load is eliminated, making it easier to depress the key top. Since the flange portion is an elastic flexible portion formed of a resin film, the flange portion does not constitute an obstacle at the time of depressing operation. Thus, it is possible to perform the key top depressing operation.

The elastic flexible portion may be formed as a flat plate extending in the sidewise moving direction of the key top. Since the elastic flexible portion is formed as a flat plate extending in the sidewise moving direction of the key top, deformation does not occur easily in the sidewise moving direction of the key top, and deformation occurs easily in the depressing direction of the key top. Thus, it is possible to provide a key sheet for a pointing device in which the sidewise movement amount of the key top corresponds to the movement amount of the magnet, making it possible to accurately obtain an input signal based on the sidewise movement of the key top, and in which the depression load in the key top depressing operation is small.

Further, according to the present invention, the support member can be formed as a base sheet composed of a rubber-like elastic material, and an accommodation recess for retaining the magnet can be provided in the base sheet, with the elastic flexible portion composed of a side wall forming the accommodation recess.

Since the support member can be formed as a base sheet composed of a rubber-like elastic material, the base sheet can constitute the support member and the elastic flexible portion. Thus, there is no need to separately prepare the elastic flexible portion, making it possible to achieve a reduction in the number of components.

The elastic flexible portion may be a side wall forming the accommodation recess, so, even in the case of a construction in which the magnet is provided on the base sheet, the magnet does not constitute an obstacle at the time of depressing operation. Thus, it is possible to perform the key top depressing operation, making it possible to effect switch input, such as confirmation input. Thus, it is possible to provide a key sheet for a pointing device in which not only is it possible to obtain positional information based on the sidewise moving direction, but also it is possible to effect switch input. The elastic flexible portion may be formed by a part or all of the side wall.

To be more specific, the accommodation recess may have a side wall whose depth is larger than the thickness of the magnet in the key top depressing direction. When the accommodation recess has a side wall whose depth is larger than the thickness of the magnet in the key top depressing direction, a portion of the side wall extending beyond the thickness of the magnet may constitute an elastic flexible portion, and displacement of the key top in the depressing direction is allowed, for example, by this portion being crushed.

Further, it is possible for the pusher side sidewall of the accommodation recess to be not firmly attached to the magnet but to be deformable away from the magnet. Since the pusher side sidewall of the accommodation recess retaining the magnet is not firmly attached to the magnet but is deformable away from the magnet, the displacement of the key top in the depressing direction is allowed through deformation of the side wall out of its shape in which the side wall retains the magnet.

Further, the elastic flexible portion may also be formed as a cylinder extending in the key top depressing direction. When the elastic flexible portion is formed as a cylinder extending in the key top depressing direction, it is possible to narrow the arrangement of the magnet in the sidewise moving direction of the key top, thereby making it possible to reduce the size of the pointing device in that direction. Further, the elastic flexible portion can be formed in a cylindrical configuration, so deformation in the sidewise moving direction of the key top does not easily occur, and deformation in the depressing direction of the key top may occur with ease. Thus, the sidewise movement amount of the key top can be accurately detected. It is also possible to reduce the depression load in the key top depressing operation.

Further, according to the present invention, there is provided, as the support member, a support plate that may be separate from the key top, which can protrude with respect to the key top in a sidewise moving direction of the key top and on which the key top is placed and an elastic flexible portion is the support plate.

Since the support member can be formed as a support plate protruding in the sidewise moving direction with respect to the key top, the magnet can be fixed in position on the outer side of the side surface of the key top. Thus, it is possible, for example, to reduce the distance between the magnetic sensor arranged on the board and the magnet. Thus, it is possible to use a magnet of a smaller magnetic flux density as compared with the prior art technique in which the distance between the two is large.

Since the elastic flexible portion can be a support plate, the magnet does not constitute an obstacle at the time of depressing operation even in the case of a construction in which the magnet is provided on the support plate. Thus, it is possible to perform the key top depressing operation, making it possible to effect switch input, such as confirmation input. Thus, it is possible to provide a key sheet for a pointing device in which not only is it possible to obtain positional information based on the sidewise moving direction, but also it is possible to effect switch input.

The elastic flexible portion is a tongue portion formed by a through-hole extending through the thickness of the support plate. When the tongue portion formed by the through-hole is provided in the support plate, and the tongue portion is formed as the elastic flexible portion, it is possible for the tongue portion to deflect around a base portion thereof as a center with respect to portions other than the tongue portion due to the formation of the tongue portion even in the case of a support plate which, if left in the plate-like form, would have no flexibility, thus making it possible to perform the key top depressing operation.

An annular blind member is provided on the side of the outer peripheral surface of the key top, and the blind member is a cover plate which has an insertion hole that allows relative movement of the key top in the key top depressing direction and which conceals the support member or the magnet from the outside at a sidewise position with respect to the key top. When the key top is moved sidewise, the support member and the magnet move sidewise together with the key top. Thus, it can happen, for example, that the support member on the board side of the key top, etc. are visible through an opening of another member, such as a casing through which the key top protrudes. However, in the present invention described above, the blind member covers the portion sidewise with respect to the outer peripheral surface of the key top, that is, the surface side of the support member, the magnet, etc., so when the key top moves sidewise, the blind member covers the support member and the magnet, thus making it possible to conceal them from the exterior.

The inner periphery of the blind member is not firmly attached to the side surface of the key top, and the blind member can make relative movement in the depressing direction with respect to the key top, so the key top is not constrained by the blind member at the time of depressing operation, thus making it possible to depress the key top. It is possible to effect switch input such as confirmation input, making it possible to provide a key sheet for a pointing device in which not only is it possible to obtain positional information based on the sidewise moving direction but also it is possible to effect switch input.

The magnet may be formed as an annular magnet, or a plurality of magnets arranged at circumferential positions. In this case, the magnetizing direction of the magnet may be an in-out direction with respect to the annulus or the circumference. Since the magnet is composed of an annular magnet or a plurality of magnets arranged in circumferential positions, it is possible to reduce the distance between the magnet and the magnetic sensor, making it possible to apply a magnet with a small magnetic flux density. Further, it is possible to detect the sidewise movement amount of the key top accurately in whatever sidewise direction in a range of 360 degrees that the key top may move.

Those magnets are arranged at circumferential positions at the same distance from a predetermined position of the key top, so it is possible to equally detect any sidewise horizontal displacement with respect to the board in the range of 360 degrees around the initial position of the key top. Further, it is possible to reduce the distance between the plurality of magnetic sensors and the magnet, making it possible to use a magnet with a smaller magnetic flux density. Here, in the case of a circular key top, the predetermined position of the key top is usually the center thereof. In some designs, however, the key top used is not symmetrical, so it is not always necessary for the predetermined position to be the center of the key top. That is, it is a position constituting a center with respect to any sidewise moving direction of the key top within the range of 360 degrees.

Further, the magnetizing direction of the magnet(s) may be an in-out direction with respect to the annulus or the circumference. Since the magnetizing direction of the magnet(s) may be an input direction with respect to the annulus or the circumference, it is possible, in the case, for example, of an annular magnet, to magnetize the inner peripheral side as a south pole (S-pole), and the outer peripheral side as a north pole (N-pole), so, as compared with the case in which the magnetization is effected in the thickness direction of the magnet, for example, with the upper side being magnetized as an S-pole and the lower side as an N-pole, it is possible to reduce the density of magnetic flux leaked to the exterior, and to achieve an improvement in terms of temperature characteristics. Further, by making the magnetism sensing direction of the magnetic sensor horizontal with respect to the board, it is possible to conspicuously sense any change in the magnetic flux with respect to the movement of the magnet. Further, it is possible to achieve a reduction in the thickness of the pointing device.

Further, the present invention can provide a pointing device equipped with the key sheet as described above, and magnetic sensors. With the provision of the key sheet, it is possible to perform key top depressing operation, making it possible to provide a pointing device in which not only is it possible to detect the displacement amount based on the sidewise movement of the magnet, but also it is possible to effect switch input.

This pointing device can be formed as one in which the magnet and the magnetic sensors are positioned in a plane parallel to the board. Since the magnet and the magnetic sensors are arranged in a plane parallel to the board, it is possible to shorten the distance between the magnet and the magnetic sensor. Further, the magnetizing direction of the magnet may be the sidewise moving direction of the key top. Thus, it is possible to apply a magnet with a low magnetic flux density, making it possible to use even a magnetic sensor whose sensitivity cannot be said to be excellent. Further, it is possible to provide a pointing device which is very compact in the depressing direction of the key top.

The key sheet for a pointing device and the pointing device of the present invention may be provided with a magnet with a small magnetic flux density or a magnet with a large size, and provides a high degree of freedom in terms of the magnet to be selected, thus allowing a design in conformity with the requisite performance. In particular, it can be designed so as to be reduced in dimension in the depressing direction of the key top.

The present invention is not restricted to the above description, and the object, advantages, features, and uses of the present invention will become further apparent from the following description given with reference to the accompanying drawings. Further, it should be understood that all appropriate modifications not departing from the gist of the present invention are to be covered by the scope of the present invention.

DESCRIPTION OF THE PREFERRED EMBODIMENTS

Figure 1:
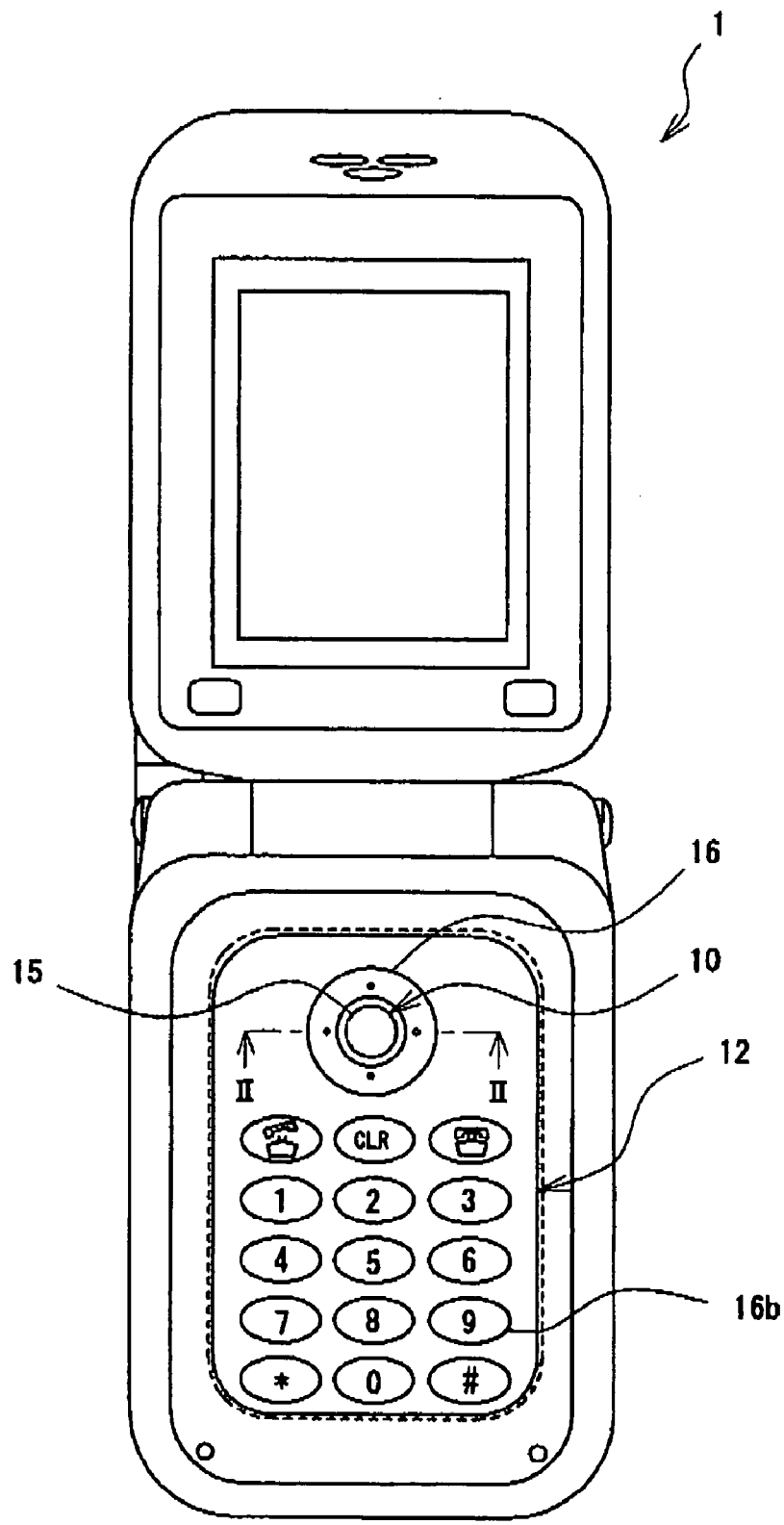
FIG. 1 is an outward view of an electronic apparatus in which a pointing device according to the present invention is mounted.

In the following, embodiments of the present invention will be described with reference to the drawings. In the drawings, various portions and components are indicated by reference symbols. In the following description of the embodiments, a redundant description of materials and structures common to the foregoing embodiments will be omitted.

First Embodiment

Figure 2:
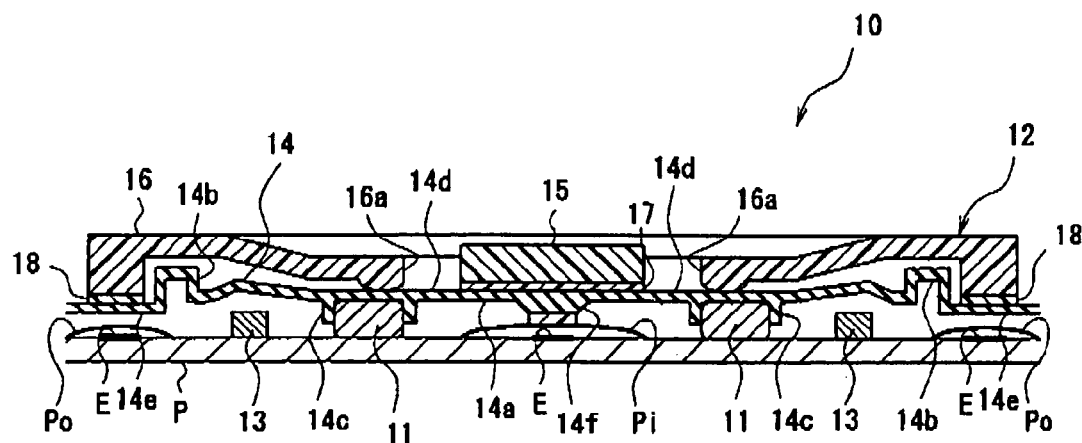
FIG. 2 is a sectional view taken along the line II-II of FIG. 1 showing a pointing device according to a first embodiment of the present invention.

{FIGS. 1 through 6} a pointing device (10) according to this embodiment is used in an electronic apparatus (1) shown in FIG. 1, and is, as shown in FIG. 2, composed of a key sheet (12) retaining an annular magnet (11) so as to allow sidewise movement, and magnetic sensors (13) mounted on a board (P). The key sheet (12) for the pointing device (10) is equipped with a base sheet (14) formed of a rubber-like elastic material constituting a "support member" for supporting the annular magnet (11), a substantially circular central key top (15) placed on the base sheet (14), a substantially annular outer peripheral key top (16), and small key tops (16b) arranged in five rows and three columns as shown in FIG. 1, The electronic apparatus (1) can beta mobile phone, a personal digital assistant (PDA), a game controller, a car navigation apparatus, or a car audio apparatus.

The central key top (15) may be formed of an elastomer, a hard resin or a metal. Likewise, the outer peripheral key top (16) may be formed of an elastomer, a hard resin or a metal. The hard resin may include, but is not limited to, a polycarbonate or an ABS resin. The central key top (15) and the outer peripheral key top (16) may each be formed in configurations corresponding to various designs, such as a substantially cylindrical configuration or a substantially parallelepiped-like configuration. The small key tops (16b) are formed as blocks, showing no flexibility when an operation load applied the small key tops (16b). The central key top (15) and the outer peripheral key top (16) are firmly attached to the base sheet (14) respectively through an intermediation of an adhesive layer (17) and an adhesive layer (18) composed of an adhesive. In the same way, the small key tops (16b) are formed of a hard resin or the like, and are firmly attached to the base sheet (14) by an adhesive or the like.

The base sheet (14) is formed of a rubber-like elastic material. The rubber-like elastic material may be a silicone rubber or a styrene type thermoplastic elastomer. The base sheet (14) supports the central key top (15), the outer peripheral key top (16), etc., retaining the annular magnet (11). To further divide the base sheet (14) in terms of function and configuration, the base sheet (14) may be composed of a central key top placing portion (14a) constituting a portion on which the central key top (15) is placed, an expandable portion (14b) bent in a multi-step wave-like configuration, an accommodation recess (14c) for retaining the annular magnet (11), an elastic flexible portion (14d) situated between the central key top placing portion (14a) and the accommodation recess (14c), an outer peripheral key top placing portion (14e) constituting a portion on which the outer peripheral key top (16) is placed, and a pusher (14f) protruding from the central key top placing portion (14a) toward a contact belleville spring (Pi) and opposed to a contact input portion (E) of the board (P). For a reduction in coefficient of friction, etc., a forward end of the pusher (14f) may be separately covered with a resin or the like.

Figure 3:
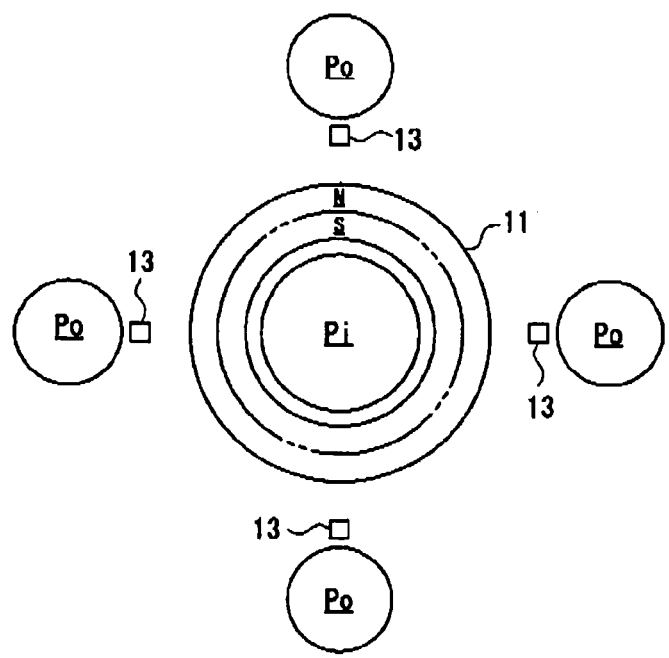
FIG. 3 is a schematic plan view showing an arrangement relationship between an annular magnet, and magnetic sensors and contact belleville springs of a board.

The annular magnet (11) is retained in the accommodation recess (14c) of the base sheet (14) at an outer position around the pusher (14f), that is, at a position in a sidewise moving direction of the central key top (15) around the pusher (14f) and at a position spaced apart from the central key top (15). Apart from a permanent magnet, the annular magnet (11) may be composed of a plastic magnet. The plastic magnet may be formed by molding a powder with a binder resin. The molding powder can include a magnetic powder. The magnetic powder can include an Al—Ni—Co magnetic powder, a ferrite magnetic powder, a samarium-cobalt magnetic powder, a neodymium magnetic powder, or any other magnetic powder. As shown in FIG. 3, it is desirable for magnetizing direction of the annular magnet (11) to be such that an outer peripheral portion of the annular magnet (11) constitutes an N-pole, and that an inner peripheral portion of the annular magnet (11) constitutes an S-pole. The annular magnet (11) may be situated sidewise with respect to the magnetic sensors (13) placed on the board (P) as seen in FIG. 2. Moreover, the annular magnet (11) and the magnetic sensors (13) may be positioned in the same plane on the board (P).

A magnetic sensor (13) may include a Hall element, a Hall IC, a magneto-resistance effect element, or a magneto-resistance effect IC. As shown in FIG. 2, in this embodiment, the magnetic sensors (13) are mounted on the board (P) at positions on the outer side of the annular magnet (11) and on the inner side of the expandable portion (14b) of the base sheet (14).

Next, an operation and effect of the pointing device (10) will be described.

Figure 4:
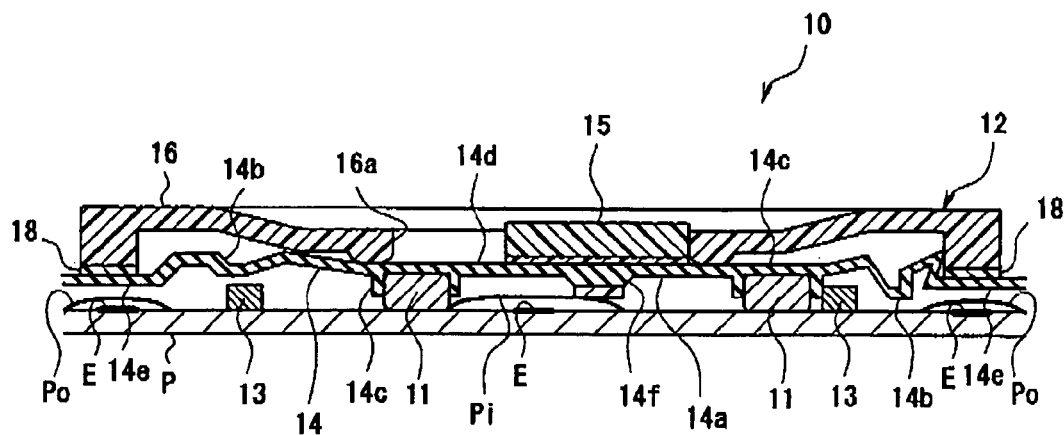
FIG. 4 is a sectional view of a central key top of the pointing device of FIG. 2 as moved to the right.

The central key top (15) can move, for example, to the right as shown in FIG. 4 within a diameter range of an opening (16a) formed between the central key top (15) and the outer peripheral key top (16). Apart from this, the central key top (15) can move sidewise in all directions of 360 degrees toward the outer peripheral key top (16). Further, as shown in FIG. 5, the central key top (15) can be depressed downwards toward the board (P).

The expandable portion (14b) of the base sheet (14) can be between the outer peripheral key top (16) and the board (P), and can expand and contract in conformity with the sidewise movement of the central key top (15). Thus, when, as shown in FIG. 4, the central key top (15) is moved toward the right in FIG. 4, a portion of the expandable portion (14b) on a side (right-hand side in FIG. 4) approached by the central key top (15) can be deformed to be bent, and a portion thereof on a side (left-hand side in the figure) from which the central key top (15) moves away is deformed to expand. As a result, the central key top (15), supported by the central key top placing portion (14a), can move sidewise. The force with which the central key top (15), moved sidewise, may be restored to an initial position is mainly provided by the expandable portion (14b).

Figure 5:
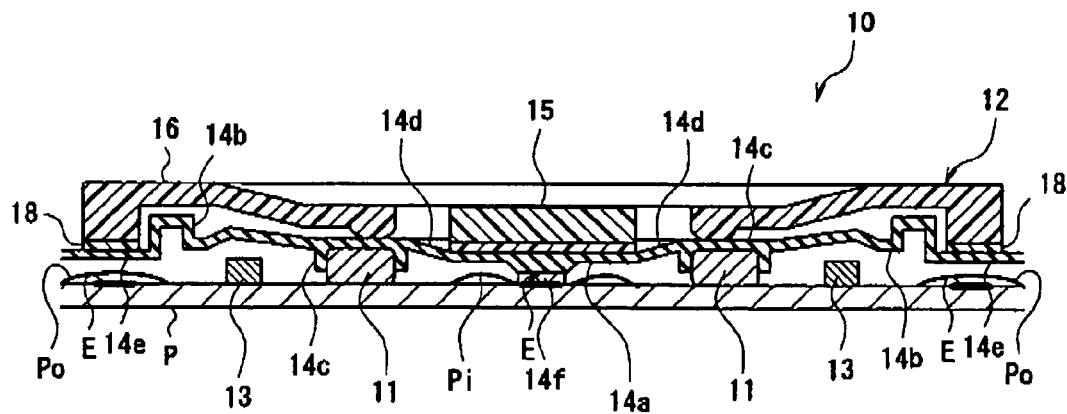
FIG. 5 is a sectional view showing a state in which the central key top of the pointing device of FIG. 2 has been depressed.

On the other hand, as shown in FIG. 5, when depressing operation is performed on the central key top (15) in a direction perpendicular to the sidewise direction, while the annular magnet (11) held in contact with the board (P) remains unmovable, the elastic flexible portion (14d) between the annular magnet (11) retained by the accommodation recess (14c), and the pusher (14f), which is in the form of a flat plate parallel to the sidewise movement plane of the central key top (15) (plane drawn as the central key top (15) moves sidewise), expands upon the depressing operation performed on the central key top (15), and is displaced in the depressing direction. In this way, the pusher (14f) causes the contact belleville spring (Pi) to buckle. As a result, a click feel is generated, and a contact input portion (E) is brought into conduction, making it possible to effect switch input, such as confirmation input, When the depression in the depressing direction is canceled, the central key top (15) can be restored to its initial position by the restoring force derived from the contraction of the elastic flexible portion (14d).

In this way, through sidewise movement of the central key top (15), the distance between the annular magnet (11) and the magnetic sensors (13) may vary, and the magnetic sensors (13) may read a change in the magnetic flux density, whereby the position in the horizontal direction of the annular magnet (11) can be sensed. Further, through the depressing operation on the central key top (15), the contact belleville spring (Pi) and the contact input portion (E) can be brought into conduction, making it possible to effect switch input.

The outer peripheral key top (16) provided in the key sheet (12) may cause the contact belleville springs (Po) to buckle through depressing operation at four direction positions in plan view, at upper, lower, right, and left positions, making it possible to effect directional input. The small key tops (16b) may also function as ON/OFF switches.

Figure 6:
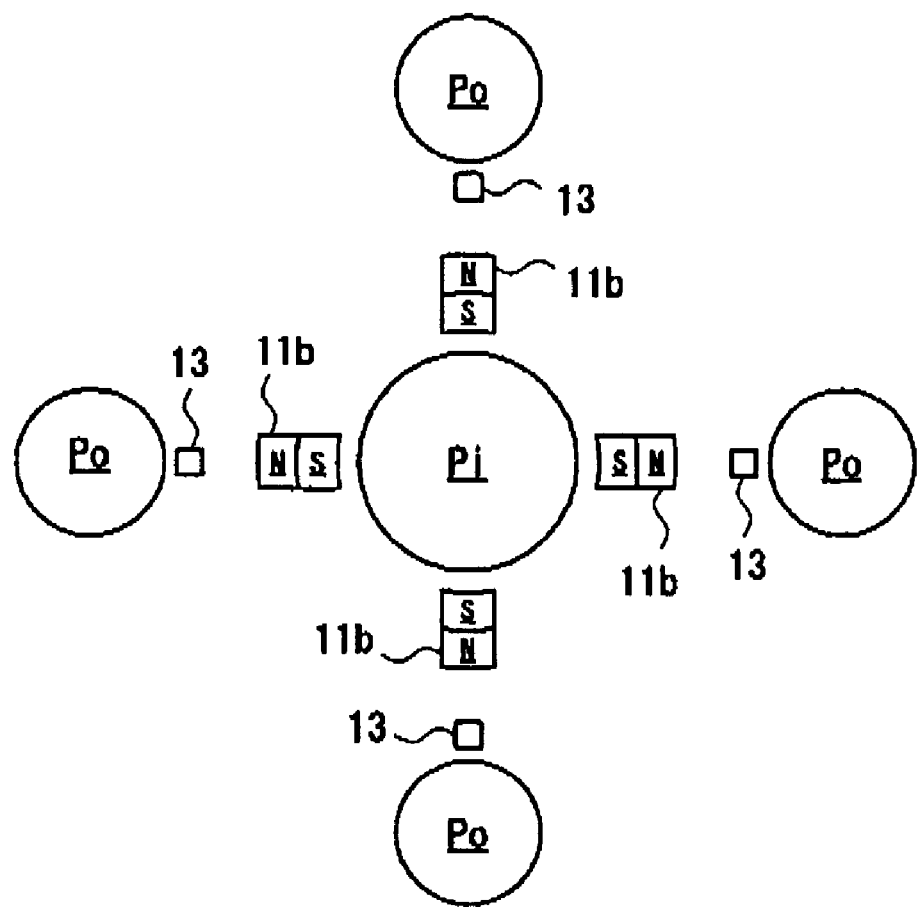
FIG. 6 is a schematic plan view showing an arrangement relationship between a plurality of magnets, and the magnetic sensors and the contact belleville springs of the board.

In the pointing device (10), the annular magnet (11) is not accommodated inside the central key top (15). Instead, the annular magnet (11) can be accommodated on the outer side of the central key top (15) in the accommodation recess (14c) of the base sheet (14) away from the central key top (15). By accommodating the annular magnet (11) on the outer side of the central key top (15) in the accommodation recess (14c) of the base sheet (14) away from the central key top (15), it is possible to shorten the distance between the magnet and the magnetic sensors (13). Further, it is possible to reduce the thickness of the pointing device key sheet (12). In the prior-art technique, in which the magnet is accommodated in the key top, the magnetic sensors and the magnet are situated vertically with respect to each other, so the magnetizing direction of the magnet is in a thickness direction (vertical direction) of the key top. Thus, the magnet cannot help but be thick in the thickness direction of the key top. In contrast, in the present invention, as shown in FIG. 3, the magnetizing direction of the annular magnet (11) is such that the outer peripheral portion can be an N-pole and that the inner peripheral portion can be an S-pole. As a result, it is possible to reduce the size in the thickness direction of the central key top (15) in this embodiment. As compared with the case in which the magnetizing direction is the vertical direction, this construction, in which the magnetizing direction is an in-out direction, allows a reduction in the magnetic flux density leaked to the outside. Further, the magnetizing direction is matched with the moving direction of the central key top (15), which moves sidewise, so it is also possible to enhance an accuracy with which the magnetic flux density at the magnetic sensors (13) is detected. Thus, as compared with the conventional pointing devices, it is possible to achieve a further reduction in magnet size and magnetic intensity. This means further space becomes available, making it possible to use a larger magnet as needed. As a result, the pointing device (10) can be suitably used in an apparatus (1). When there is an urgent demand for a reduction in size and thickness, it is possible to realize with high accuracy a variety of input operations, such as scrolling of a display screen and an input of coordinates. Instead of providing the annular magnet (11), it is possible, as shown in FIG. 6, to provide a plurality or magnets (11b) arranged at circumferential positions.

Second Embodiment

Figure 7:
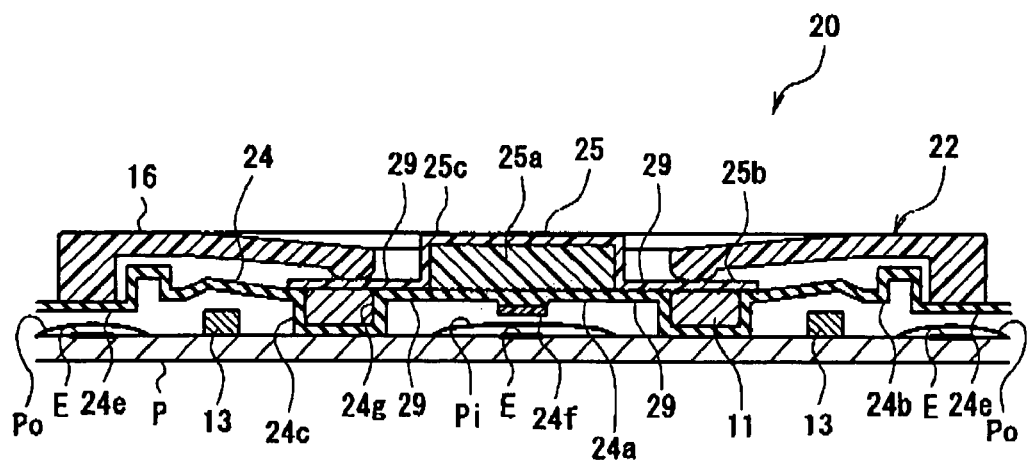
FIG. 7 is a sectional view, corresponding to FIG. 2, of a pointing device according to a second embodiment of the present invention.
Figure 8:
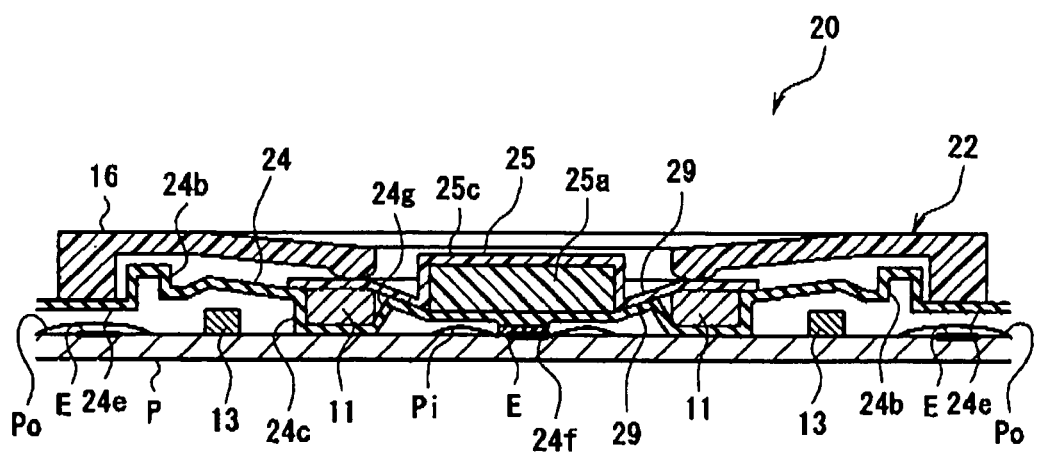
FIG. 8 is a sectional view showing a state in which a central key top of the pointing device of FIG. 7 has been depressed.

{FIGS. 7 and 8}: a pointing device (20) according to this embodiment and a key sheet (22) used in the pointing device (20) are shown in FIGS. 7 and 8. Unlike the central key top (15) of the first embodiment of the present invention, the central key top (25) of this embodiment is formed by a key top main body portion (25a), which is composed of a mass of hard resin without flexibility. A resin film (25c) separate from the key top main body portion (25a) covers the key top main body portion (25a), and forms a flange portion (25b). The flange portion (25b) protrudes from the key top main body portion (25a). The hard resin may include, but is not limited to, a polycarbonate or an ABS resin. While the resin film (25c) is a member separate from the key top main body portion (25a), the resin film (25c) and the key top main body portion (25a) may be held in intimate contact with each other. Two-color molding or the like can be used to hold the resin film (25c) and the key top main body portion (25a) in intimate contact with each other. Further, an accommodation recess (24c) in a base sheet (24) as the "support member" can be formed so as to cover the annular magnet (11) from the board (P) side. Further, the base sheet (24) is firmly attached to the central key top (25) and the outer peripheral key top (16) by fusion-bonding.

In this embodiment, the base sheet (24) formed of a rubber-like elastic material and the flange portion (25b) formed of the resin film (25c) are stacked together to be firmly integrated with each other, forming an elastic flexible portion (29) between a central key top placing portion (24a) and the annular magnet (11). However, since the resin film (25c) is also flexible, it is possible to perform depressing operation on the central key top (25). Examples of the material used for the resin film (25c) may include a polyethylene terephthalate film, a polycarbonate film, a polyacrylic film, or a copolymer of polycarbonate film and polybutylene terephthalate film. Further, it is possible to use a resin film (25c) formed of a fluororesin, a polyamide resin, or the like. The resin film (25c) exhibits wear resistance and low coefficient of friction. In order for the resin film (25c) to be flexible enough to deflect upon depression of the central key top (25), it is desirable for the film thickness to be 0.3 mm or less.

In this embodiment, it is possible to leave side walls (24g) of the accommodation recess (24c) non-bonded to the annular magnet (11). As a result, as shown in FIG. 8, the side walls (24g) of the accommodation recess (24c) can also undergo deformation through depression of the central key top (25). Further, due to the structure in which the bottom surface of the accommodation recess (24c) can be held in contact with the board (P). Holding the bottom surface of the accommodation recess (24c) in contact with the board (P) can protect the accommodation recess (24c) from friction with the board (P). It is possible to provide some contrivance to reduce sliding resistance by providing a protective layer on at least one of contact surfaces of the board (P) and the accommodation recess (24c).

In the pointing device (20) of this embodiment and the key sheet (22) used in the pointing device (20), the accommodation recess (24c) may be provided in the base sheet (24), and the annular magnet (11) may be arranged in the accommodation recess (24c). Through this arrangement, it is possible to reduce the thickness of the key sheet (22) in the depressing direction of the central key top (25). Further, the elastic flexible portion (29) may be formed through stacking of the resin film (25c) and the base sheet (24). Not only is it possible to perform depressing operation on the central key top (25), but also it is advantageously hard for the elastic flexible portion (29) to deflect at the time of sidewise movement of the central key top (25). As a result, there are provided a pointing device (20) and a key sheet (22) in which it is possible to accurately ascertain the movement amount of the central key top (25).

Third Embodiment

Figure 9:
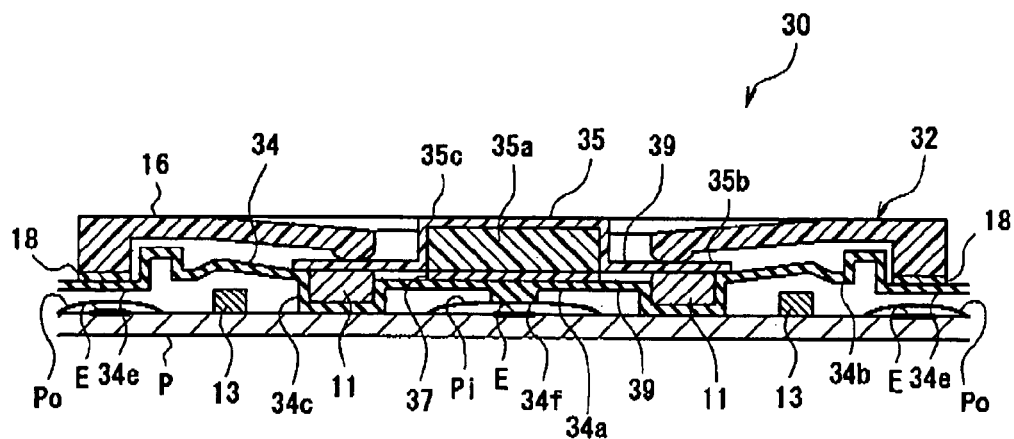
FIG. 9 is a sectional view, corresponding to FIG. 2, of a pointing device according to a third embodiment of the present invention.
Figure 10:
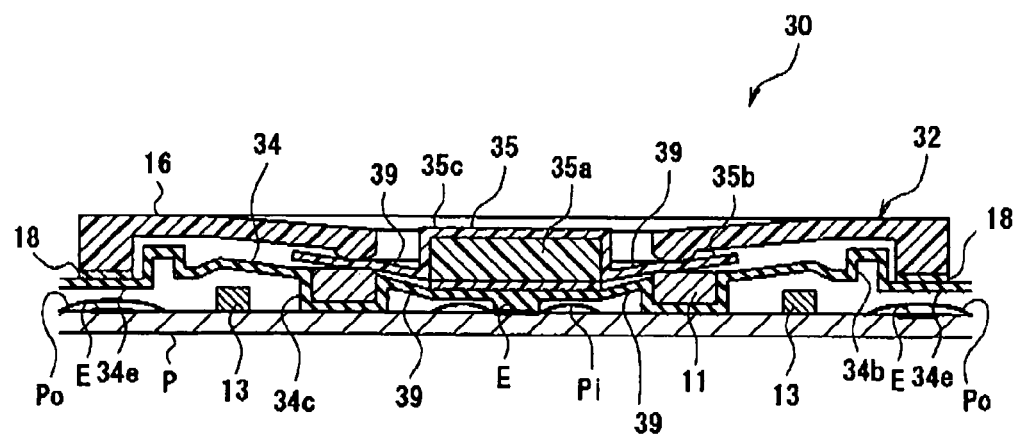
FIG. 10 is a sectional view showing a state in which the central key top of the pointing device of FIG. 9 has been depressed.

{FIGS. 9 and 10}: FIGS. 9 and 10 show a modification of the second embodiment of the present invention. While in the second embodiment, the bonding between the central key top (25) and the base sheet (24) is effected by fusion-bonding, in a pointing device (30) according to the third embodiment and a key sheet (32) used in the third embodiment, the bonding between a key top main body portion (35a) and a base sheet (34) can be effected restrictively by an adhesive (37). Further, a pusher (34f) is formed entirely of a rubber-like elastic material down to the forward end of the pusher (34f). In this way, when the resin film (35c) portion and the base sheet (34) are not bonded to each other, the resin film (35c) portion of the elastic flexible portion (39) undergoes deformation easily by the depressing operation on a central key top (35), whereby it is possible to achieve a reduction in depression load. Examples of the material used for the resin film (35c) portion may include a polyethylene terephthalate film, a polycarbonate film, a polyacrylic film, or a copolymer of polycarbonate film and polybutylene terephthalate film.

Fourth Embodiment

Figure 11:
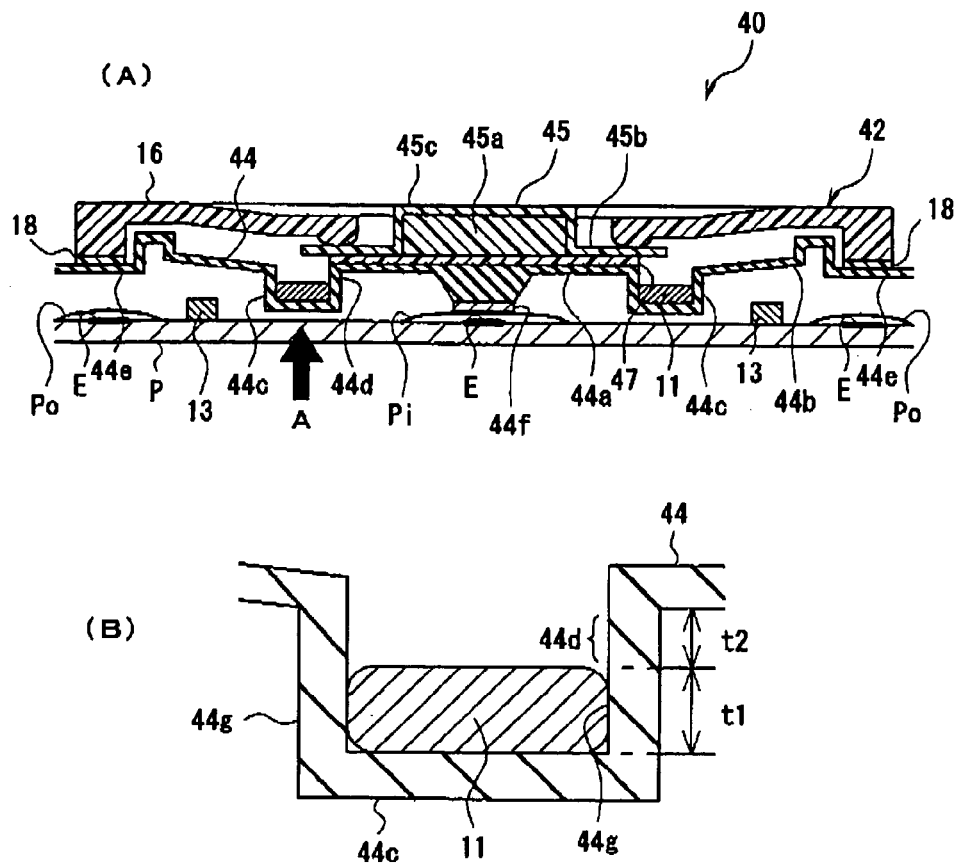
FIG. 11A is a sectional view, corresponding to FIG. 2, of a pointing device according to a fourth embodiment of the present invention.
FIG. 11B is an enlarged view of a portion A of FIG. 11A.

{FIG. 11}: FIGS. 11A and 11B show a pointing device (40) according to the fourth embodiment and a key sheet (42) used in the pointing device (40). In the fourth embodiment, the annular magnet (11) is arranged at a position where the annular magnet (11) overlaps a flange portion (45b) of a central key top (45) in the depressing direction of the central key top (45). That is, the area of a central key top placing portion (44a) of a base sheet (44) as the "support member" is smaller than the area of the back surface of the flange portion (45b). Further, an accommodation recess (44c) is not in contact with the board (P) but is arranged at a position raised from the board (P).

FIG. 11B is an enlarged view of a portion A of FIG. 11A. In the fourth embodiment, the base sheet (44) may be bent perpendicularly from the central key top placing portion (44a) to form the accommodation recess (44c). Side walls (44g) forming the accommodation recess (44c) are formed as side walls (44g) whose depth is larger than a thickness (t1) of the annular magnet (11) in the depressing direction of the central key top (45) by a depth (t2). The portions of the side walls (44g) not in contact with the annular magnet (11) and corresponding to the depth (t2) may constitute an elastic flexible portion (44d) allowing displacement in the depressing direction of the central key top (45). The elastic flexible portion (44d) may constitute a cylinder extending in the depressing direction of the central key top (45).

Further, while a resin film (45c) used in this embodiment may be a flexible resin film like the resin film (25c) of the key sheet (22) of the second embodiment, the resin film (45c) may also be formed, by changing a material and film thickness, as the resin film (45c) exhibiting no flexibility within the range of the operation load that the central key top (45) receives. That is, by integrating the key top main body portion (45a) with the resin film (45c), it is possible to form a central key top (45) exhibiting no flexibility as a whole including the key top main body portion (45a) and the flange portion (45b). Examples of the material used for the resin film (45c) may include a polyethylene terephthalate film, a polycarbonate film, a polyacrylic film, or a copolymer of polycarbonate film and polybutylene terephthalate film.

The depressing operation can be effected on the central key top (45) through deformation of the elastic flexible portion (44d) to crush the same, and through movement until the bottom surface of the accommodation recess (44c) comes into contact with the board (P). Thus, it is possible to obtain a sufficient click feel. On the other hand, at the time of sidewise moving operation of the central key top (45), due to the formation of the elastic flexible portion (44d) as a cylinder extending along the inner side wall of the annular magnet (11), the elastic flexible portion (44d) does not easily undergo deformation. Thus, it is possible to grasp the correct position of the central key top (45) corresponding to the sidewise movement amount.

In this way, in the pointing device (40) of the fourth embodiment and the key sheet (42) used in the pointing device (40), the elastic flexible portion (44d) is provided between the accommodation recess (44c) and the central key top (45), and a gap is provided between the accommodation recess (44c) and the board (P). So even if the annular magnet (11) exists between the board (P) and the central key top (45), it is possible to perform depressing operation on the central key top (45). Further, since the accommodation recess (44c) is spaced away from the board (P), it is possible to reduce the frictional resistance at the time of sidewise movement of the central key top (45). Further, since the central key top (45) and the annular magnet (11) are arranged so as to partially overlap each other in the depressing direction of the central key top (45), it is possible to reduce the size of the pointing device (40) in the width direction.

Further, in the key sheet (42) of the fourth embodiment, the elastic flexible portion (44d) is also provided in the side walls (44g) forming the accommodation recess (44c). So it is possible to provide a key sheet (42) in which it is possible to depress the contact belleville spring (Pi) to generate a sufficient click feel irrespective of the set distance between the accommodation recess (44c) and the board (P).

Fifth Embodiment

Figure 12:
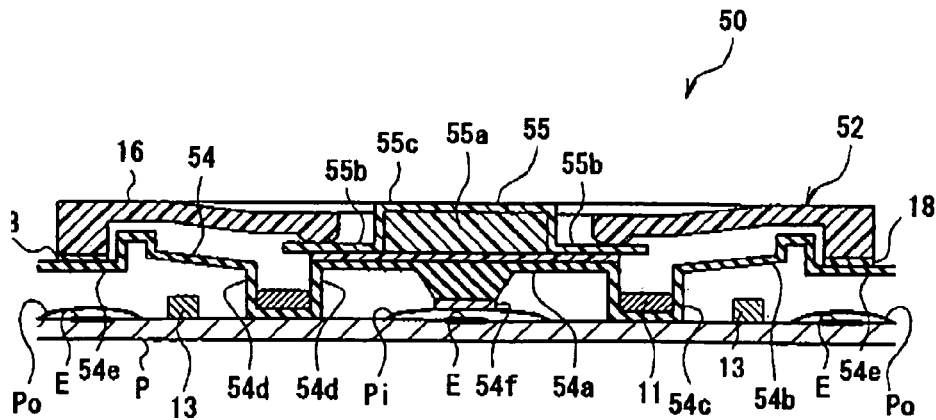
FIG. 12 is a sectional view, corresponding to FIG. 2, of a pointing device according to a fifth embodiment of the present invention.

{FIG. 12}: in a pointing device (50) shown in FIG. 12, which is a modification of the fourth embodiment. The fifth embodiment includes a key sheet (52), and an accommodation recess (54c) in contact with the board (P). Thus, it is possible to increase the length of the elastic flexible portion (54d) by the length corresponding to the gap between the accommodation recess (54c) and the board (P).

In the pointing device (50) of the fifth embodiment and the key sheet (52) using the pointing device (50), It is possible to shorten the distance between the annular magnet (11) and the magnetic sensors (13) than that of the fourth embodiment.

Sixth Embodiment

Figure 13:
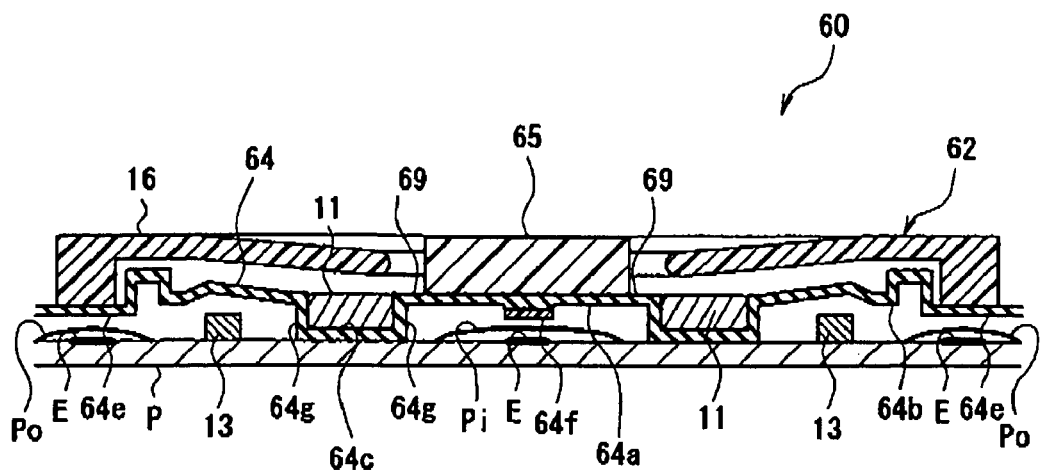
FIG. 13 is a sectional view, corresponding to FIG. 2, of a pointing device according to a sixth embodiment of the present invention.
Figure 14:
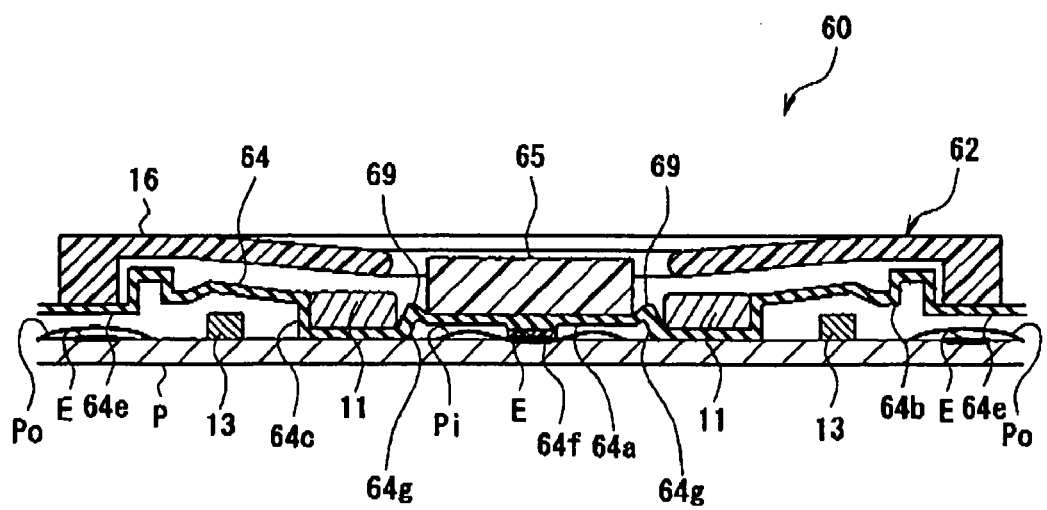
FIG. 14 is a sectional view showing a state in which a central key top of the pointing device of FIG. 13 has been depressed.

{FIGS. 13 and 14}: Shown in FIG. 13 in a pointing device (60) according to the sixth embodiment are a key sheet (62) used in the pointing device (60), and side walls (64g) of an accommodation recess (64c) provided in a base sheet (64). The base sheet (64) may constitute a "support member". The inner side wall (64g) that is closer to a pusher (64f) is not firmly attached to the annular magnet (11). Instead, the inner side wall (64g) that is closer to a pusher (64f) is deformable away from the annular magnet (11) and toward the pusher (64f). As shown in FIG. 14, which shows a state in which the central key top (65) has been depressed, both a portion connecting the side wall (64g) and the central key top placing portion (64a) and the side wall (64g) constitute an elastic flexible portion (69).

In the pointing device (60) of the sixth embodiment and the key sheet (62) used therein, it is possible to perform depressing operation on the central key top (65) even if the central key top (65) and the annular magnet (11) are arranged very close to each other.

Seventh Embodiment

Figure 15:
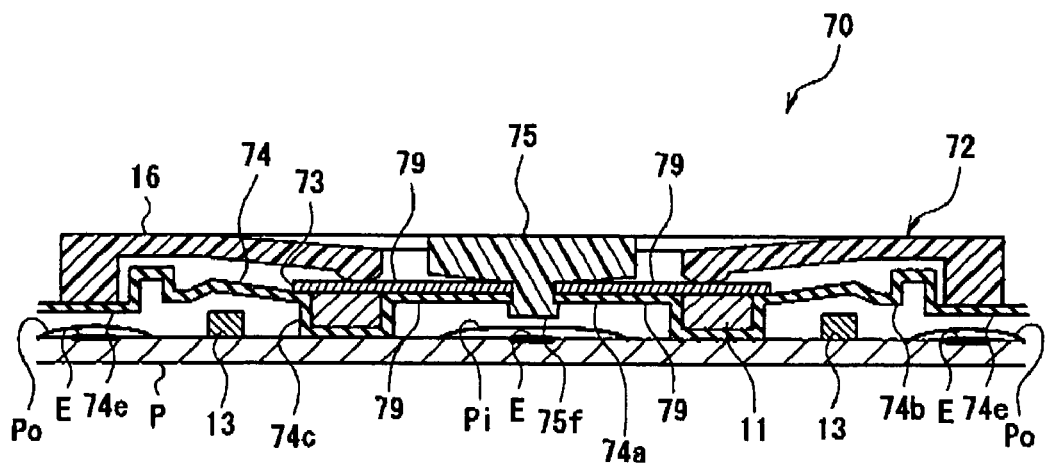
FIG. 15 is a sectional view, corresponding to FIG. 2, of a pointing device according to a seventh embodiment of the present invention.
Figure 16:
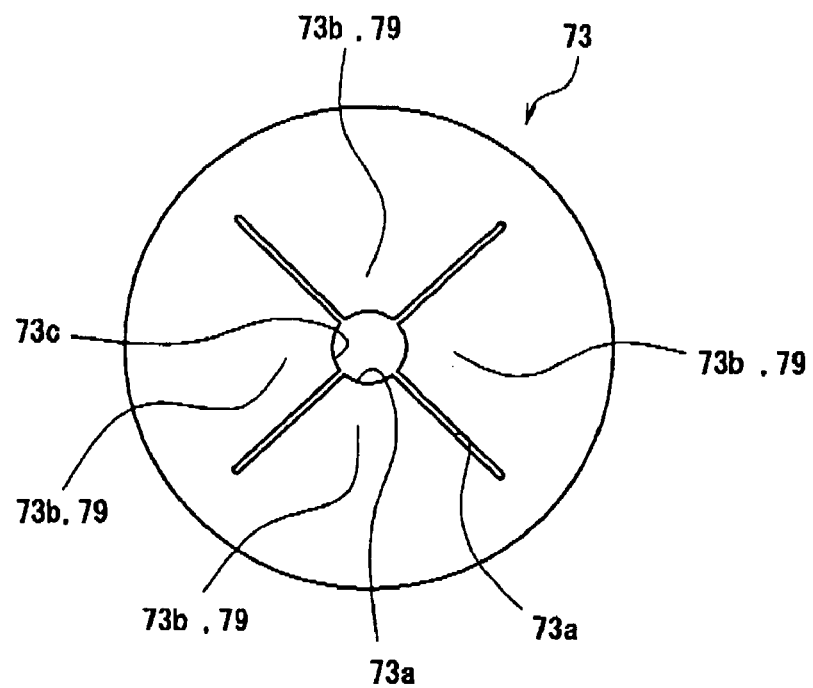
FIG. 16 is an enlarged plan view of a support plate shown in FIG. 15.

{FIG. 15}: FIG. 15 shows a pointing device (70) according to the seventh embodiment and a key sheet (72) used in the pointing device (70). In the seventh embodiment, a support plate (73) in a form of a flat plate formed of a hard resin or metal may be provided between a central key top (75) formed of a hard resin and a base sheet (74) formed of a rubber-like elastic material. The hard resin may include, but is not limited to, a polycarbonate or an ABS resin. As shown in FIG. 16, which is a plan view, the support plate (73) has four tongue portions (73b) formed in the form of tongues by punching out the support plate (73) to make a through-hole (73a) in a substantially cross-like fashion. The support plate (73) and the base sheet (74) constitute the "support member".

A pusher (75f) formed integrally with the central key top (75) protrudes through the support plate (73), so, at the central portion of the support plate (73), the portion in contact with the central key top (75) forms a key top support portion (73c). Further, the pusher (75f), which extends through the support plate (73), has a larger diameter than an inner periphery of the through-hole (73a). The through-hole (73a) may have a circular shape. Moreover, the through-hole (73a) may have a shape other that a circular shape is also within the scope of the invention. Further, the pusher (75f) and the through-hole (73a) function to prevent detachment of the central key top (75) from the support plate (73). Further, the tongue portions (73b) constitute an elastic flexible portion (79), which deflects in a direction in which the central key top (75) is depressed, thereby making it possible to perform depressing operation on the central key top (75). Further, the base sheet (74) covers the support plate (73) from below, whereby dust and water are prevented from entering an interior of the key sheet (72) through the gap between the support plate (73) and the central key top (75).

In the pointing device (70) of this embodiment and the key sheet (72) used therein, due to the provision of the hard support plate (73), when the central key top (75) moves sidewise, the elastic flexible portion (79) is not easily deformed in the sidewise moving direction. Thus, the amount by which the central key top (15) is operated can be accurately reflected in the input signal of the pointing device (50). On the other hand, when depressing operation is performed on the central key top (75), the base sheet (74) may expand, and tongue portions (73b) of the support plate (73) can be forced in, so switch input is possible. Further, when the central key top (75) is restored to the former position after depression, the pusher (75f) also functions as a detachment preventing member, and there is no fear of the central key top (75) being detached from the key sheet (72).

Eighth Embodiment

Figure 17:
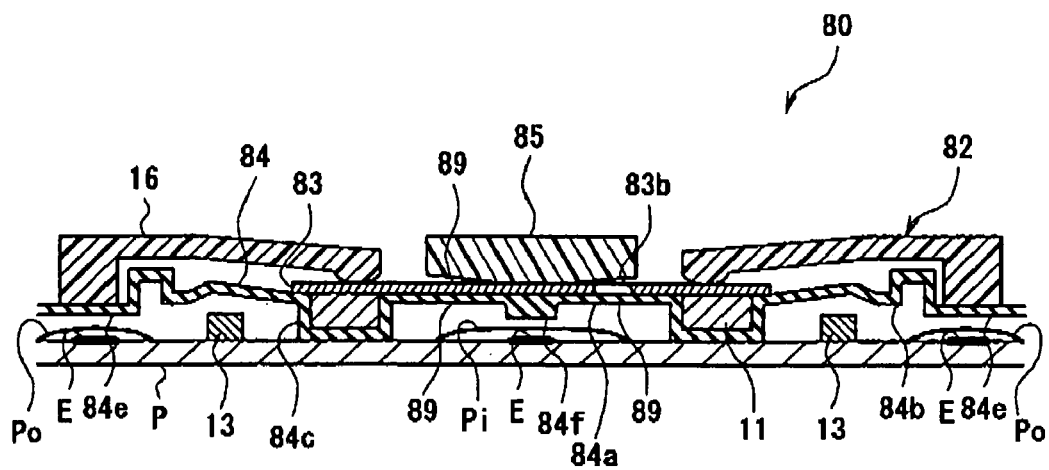
FIG. 17 is a sectional view, corresponding to FIG. 2, of a pointing device according to an eighth embodiment of the present invention.
Figure 18:
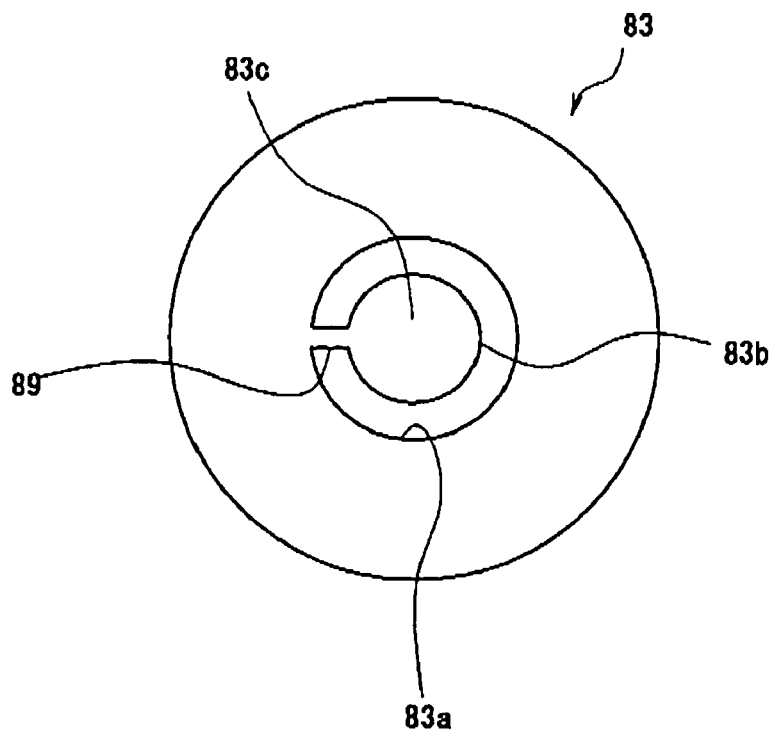
FIG. 18 is an enlarged plan view of a support plate shown in FIG. 17.

{FIG. 17}: a pointing device (80) according to this embodiment and a key sheet (82) used in the pointing device (80) are a modification of the pointing device (70) of the seventh embodiment of the present invention; the configuration of a support plate (83) and the method by which it is firmly attached to a central key top (85) are modified. As shown in FIG. 18, the support plate (83) of the eight embodiment has a central key top placing portion (83c) which is to be firmly attached to the central key top (85) and which is formed as a tongue portion (83b). For the central key top placing portion (83c) to be firmly attached to the central key top (85), a through-hole (83a) is formed around the central key top placing portion (83c). A back surface of the central key top (85) and the central key top placing portion (83c) are bonded and fixed to each other. The back surface of the central key top (85) and the central key top placing portion (83c) can be bonded and fixed to each other by an adhesive, by fusion-bonding, or the like.

In the pointing device (80) of the eight embodiment and the key sheet (82) used in the pointing device (80), an elastic flexible portion (89) can be composed not only of a base sheet (84) formed of a rubber-like elastic material, but also can be formed through stacking together with the support plate (83). The support plate (83) can be in the form of a thin plate formed of a hard resin or metal. The hard resin may include, but is not limited to, a polycarbonate or an ABS resin. As compared with the case in which the elastic flexible portion is formed of a rubber-like elastic material alone, the depression load can be increased. Thus, it is possible to achieve an improvement in terms of detection accuracy for sidewise improvement and stability in supporting the central key top (85).

Ninth Embodiment

Figure 19:
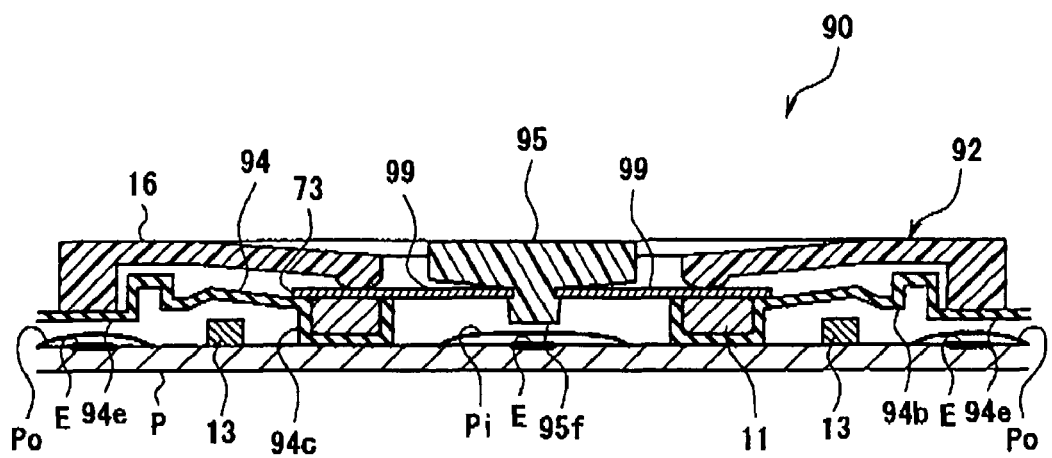
FIG. 19 is a sectional view, corresponding to FIG. 2, of a pointing device according to a ninth embodiment of the present invention.

{FIG. 19}: a pointing device (90) according to the ninth embodiment and a key sheet (92) used in the pointing device (90) are also a modification of the pointing device (70), of the seventh embodiment. The ninth embodiment differs from the seventh embodiment in that a base sheet (94) is connected with the end of the support plate (73), whereas, in the seventh embodiment of the present invention, the entire support plate (73) is covered from below. Further, the base sheet (94) has no central key top placing portion. In this way, the support plate (73) of the ninth embodiment constitutes "the support member". The pointing device (90) and the key sheet (92) used in the ninth embodiment may also be made compact in construction.

As a modification of the ninth embodiment, it is also possible to use the central key top (85) and the support plate (83) of the eighth embodiment of the present invention instead of the central key top (95) and the support plate (73).

Tenth Embodiment

Figure 20:
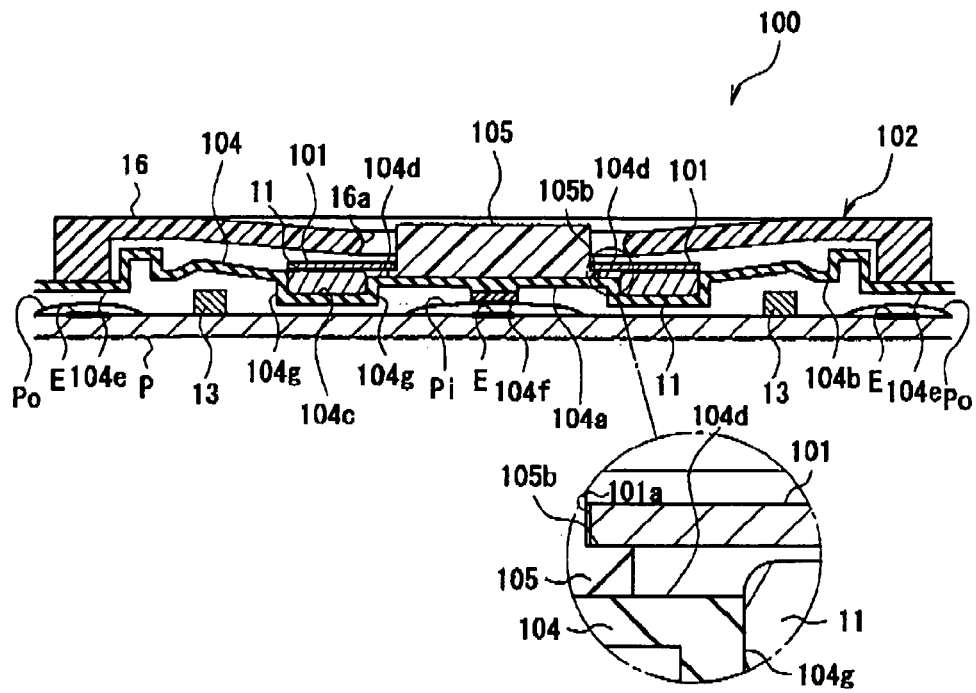
FIG. 20 is a sectional view, corresponding to FIG. 2, of a pointing device according to a tenth embodiment of the present invention.
Figure 21:
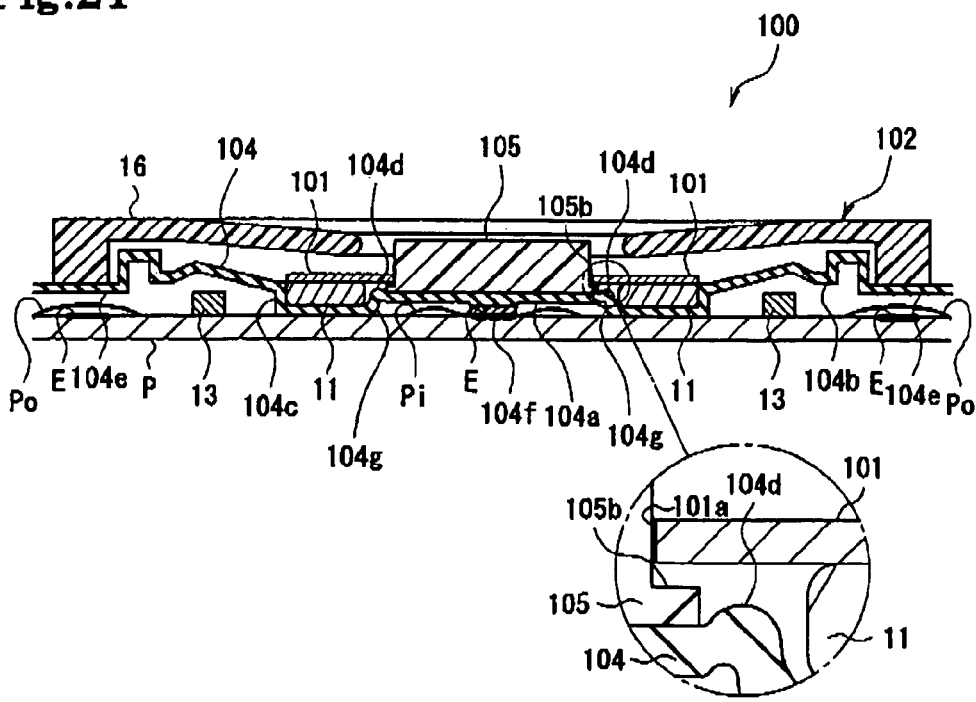
FIG. 21 is a sectional view showing a state in which a central key top of the pointing device of FIG. 20 has been depressed.

{FIGS. 20 and 21}: FIGS, 20 and 21 show a pointing device (100) according to this embodiment and a key sheet (102) used in the pointing device (100). An annular protrusion (105b) protruding sidewise can be formed at the lower end of the side surface of a central key top (105). Further, on the side of the outer peripheral surface of the central key top (105), there may be provided a blind plate (101) as a "blind member". The blind plate (101) can be composed of an annular member of stainless steel. The blind plate (101) can be engaged with the annular protrusion (105b), with the blind plate (101) being positioned so as to cover the operation surface side of the annular magnet (11). The blind plate (101) may cover the operation surface side of the annular magnet (11) while forming a gap between itself and the annular magnet (11). The outer diameter of the blind plate (101) is substantially equal to the outer diameter of the annular magnet (11), and the inner diameter of the blind plate (101) is smaller than that of the annular magnet (11). The outer peripheral surface of the central key top (105) is passed through an insertion hole (101a) of the blind plate (101). The outer peripheral surface of the central key top (105) is not firmly attached to the inner periphery of the blind plate (101). An accommodation recess (104c) provided in a base sheet (104) as the "support member" is not in contact with the board (P), but is arranged at a position raised from the board (P). An inner side wall (104g) of the accommodation recess (104c) is not firmly attached to the annular magnet (11), but is deformable away from the annular magnet (11) and toward a pusher (104f). The depth of the inner sidewall (104g) is smaller than the thickness of the annular magnet (11).

FIG. 21 shows a state in which the central key top (105) has been depressed. The portion connecting the inner side wall (104g) of the base sheet (104) and the central key top placing portion (104a) may constitute an elastic flexible portion (104d). The elastic flexible portion (104d) together with the inner side wall (104g) may undergo deformation, whereby the central key top (105) can be pushed in to form a gap between the protrusion (105b) of the central key top (105) and the blind plate (101).

In the pointing device (100) of the tenth embodiment and the key sheet (102) used in the pointing device (100), the blind plate (101) may cover the annular magnet (11) and the elastic flexible portion (104d) of the base sheet (104), so it is possible to prevent the annular magnet (11) and the base sheet (104) from being recognized through the opening (16a) of the outer peripheral key top (16). By preventing the annular magnet (11) and the base sheet (104) from being recognized through the opening (16a) of the outer peripheral key top (16), it may be possible to hide the annular magnet (11) and the base sheet (104). Further, when the central key top (105) is depressed, the inner periphery of the blind plate (101) can move relative to the outer peripheral surface of the central key top (105). If the blind plate (101) is not deformed, the central key top (105) is not constrained in the depressing direction, thus making it possible to depress the central key top (105).

Eleventh Embodiment

Figure 22:
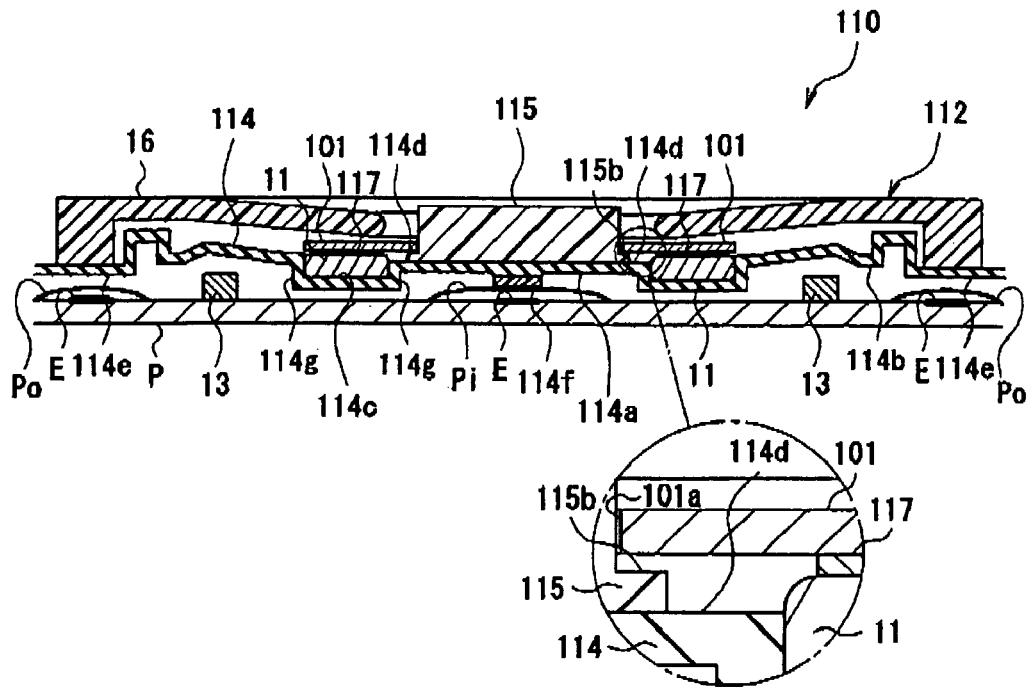
FIG. 22 is a sectional view, corresponding to FIG. 2, of a pointing device according to an eleventh embodiment of the present invention.

{FIG. 22}: in a pointing device (110) shown in FIG. 22 and a key sheet (112) used in the pointing device (110), which are a modification of the tenth embodiment of the present invention, the blind plate (101) is firmly attached to the operation surface side of the annular magnet (11). In this regard, the blind plate (101) can be attached to the operation surface side of the annular magnet (11) by means of an adhesive layer (117).

In the pointing device (110) of the eleventh embodiment and the key sheet (112) used in the pointing device (110), the blind plate (101) is firmly attached to the annular magnet (11). The annular magnet (11) may be a plastic annular magnet (11), or a thin annular magnet (11). The annular magnet (11) which could be subject to breakage by, for example, a force in the shearing direction, can be reinforced by the blind plate (101). Further, when the central key top (115) is operated to move sidewise, the annular magnet (11) moves synchronously with the central key top (115) through the intermediation of the blind plate (101). As compared with the elastic flexible portion, the blind plate (101) is less subject to deformation, so it is possible to ascertain the movement amount of the central key top (115) more accurately as compared with the case in which the synchronous movement is made through the intermediation of the elastic flexible portion. Further, the key sheet (112) and the blind plate (101) can be integrally assembled to the electronic apparatus (1).

Twelfth Embodiment

Figure 23:
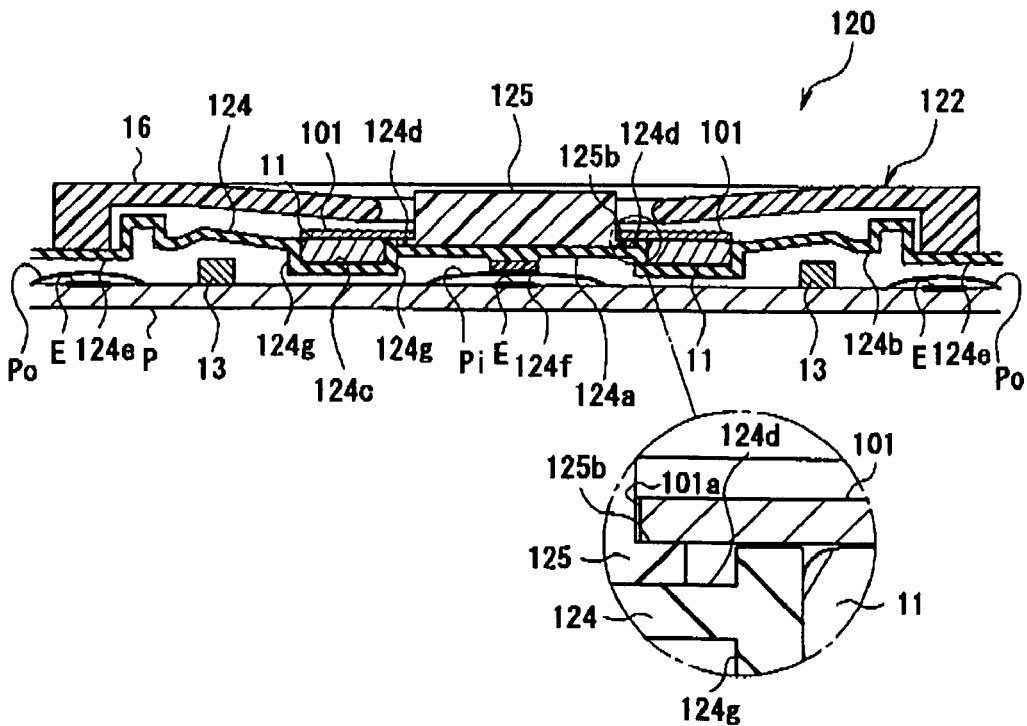
FIG. 23 is a sectional view, corresponding to FIG. 2, of a pointing device according to a twelfth embodiment of the present invention.

{FIG. 23}: in a pointing device (120) shown in FIG. 23 and a key sheet (122) used in the pointing device (120), which are a modification of the tenth embodiment of the present invention, an inner side wall (124g) of an accommodation recess (124c) protrudes beyond a central key top placing portion (124a) toward the blind plate (101), and the depth of the inner side wall (124g) is equal to the thickness of the annular magnet (11).

In the pointing device (120) of the twelfth embodiment and the key sheet (122) used in the pointing device (120), when a central key top (125) is operated to move sidewise, the inner side wall (124g) may exists like a cushion between a protrusion (125b) of the central key top (125) and the annular magnet (11). As a result, it is possible to prevent collision of the protrusion (125b) with the annular magnet (11), thereby preventing the protrusion (125b) and the magnet (11) from being fractured and making the magnet (11) less subject to detachment.

MODIFICATIONS OF THE EMBODIMENTS

Regarding the first through twelfth embodiments, the following modifications are possible.

In all the embodiments described above, it is possible to use a plurality of magnets (11b) arranged at circumferential positions as shown in FIG. 6.

While in the above embodiments the key tops (15, 16, 16b), etc. and the base sheet (14, 24, 34, 44, 54, 64, 74, 84, 94, 104, 114, 124) are separate members, it is also possible for the key tops (15, 16, 16b), etc. to be protrusions provided through deformation of the base sheet (14, 24, 34, 44, 54, 64, 74, 84, 94, 104, 114, 124). That is, it is possible for the key tops and the base sheet to be formed as one and the same member.

It is also possible to provide an inner light source, such as a light-emitting diode (LED), on the board (P) to form the central key top (15, 25, 35, 45, 55, 75, 85, 95, 105, 115, 125) and the outer peripheral key top (16) as illumination type key tops, from which illumination can be effected.

In the above-described embodiments, the outer peripheral key top (16) may be divided circumferentially. Further, it is also possible to eliminate the outer peripheral key top (16) and the small key tops (16b), forming a pointing device having the central key top (15, 25, 35, 45, 55, 75, 85, 95, 105, 115, 125) alone. In this case, input operation may be possible in all directions by 360 degrees, or solely in a specific direction, changing the number and arrangement of the magnetic sensors (13) accordingly.

It is possible to provide display portions for displaying characters, figures, symbols, etc., or colored portions formed in a predetermined tone and pattern on the central key top (15, 25, 35, 45, 55, 75, 85, 95, 105, 115, 125) and the outer peripheral key top (16).

While in the above-described embodiments the magnetic sensors (13) are arranged between the contact belleville spring (Pi) and the contact belleville springs (Po), it is also possible, for example in FIG. 3, to move the magnetic sensors (13) to positions shifted by 45 degrees around the contact belleville springs (Pi) as a center, so it is possible to arrange the magnetic sensors (13) between the contact belleville springs (Po), thereby making it possible to achieve a further reduction in size. Further, the magnetic sensors (13) may be provided not only on the front surface of the board (P) but also on the back surface thereof. Further, regarding the positional relationship between the magnetic sensors (13) and the magnet, it is also possible to arrange the annular magnet (11) on the outer peripheral side of the magnetic sensors (13).

While the pointing device (10, 20, 30, 40, 50, 70, 80, 90, 100, 110, 120) of the above embodiments allows movement by 360 degrees in a direction perpendicular to the direction in which the key top is depressed, it is also possible to provide a pointing device which allows movement solely in a specific direction, e.g., one or two directions, perpendicular to the direction in which the key top is depressed.

The description of the present invention should not be construed restrictively; advantages, features, and uses of the present invention will become still more apparent from the following description given with reference to the accompanying drawings. Further, it should be understood that all appropriate modifications made without departing from the gist of the present invention are covered by the scope of the present invention. While various embodiments of the present invention are described, it should be understood that they have been presented by way of example only, and not as a limitation. Thus, the breadth and scope of the present invention should not be limited by any of the above-described exemplary embodiments.

What is claimed is:

1. A key sheet for a pointing device, comprising:
   a key top;
   a support member having a front surface constituting an operation surface to which the key top is attached, and a back surface, which is on a reverse side of the front surface, having a pusher for depressing a contact input portion on a board opposed to the back surface;
   a magnet fixed to the support member at a position sidewise with respect to the pusher and around the pusher as a center,
   wherein when the key top is moved sidewise, the magnet moves synchronously, with a change in magnetic flux density due to the sidewise movement of the magnet being detected by magnetic sensors provided on the board, and
   wherein the base sheet defines an accommodation recess to receive the magnet, the base sheet having a first side wall a second side wall substantially parallel to the first side wall in a first state, both side walls being in a direct contact with the magnet in the first state, the second side wall including an elastic flexible portion allowing displacement in a depressing direction through depression of the key top toward the contact input portion, the elastic flexible portion being provided between the magnet and the pusher,
   wherein the support member is a base sheet formed of an elastic material.

2. A key sheet for a pointing device according to claim 1, wherein:
   the base sheet is entirely formed of a rubber-like elastic material.

3. A key sheet for a pointing device according to claim 1, wherein:
   the elastic flexible portion is a flange portion protruding from a side surface of the key top in a sidewise moving direction of the key top.

4. A key sheet for a pointing device according to claim 3, wherein:
   the flange portion is composed of a resin film which is a member separate from the key top.

5. A key sheet for a pointing device according to claim 1, wherein:
   the key top includes a key top main body portion composed of a hard resin in a form of a mass and a flange portion covering the key top main body portion and protruding from the key top main body portion, and
   the key top main body portion and the support member are attached to each other by an adhesive while the flange portion and the support member are not attached to each other.

6. A key sheet for a pointing device according to claim 1, wherein: the elastic flexible portion includes a first side wall forming the accommodation recess.

7. A key sheet for a pointing device according to claim 6, wherein:
   the first side wall having a depth larger than a thickness of the magnet in a direction in which the key top is depressed.

8. A key sheet for a pointing device according to claim 6, wherein:
   the first side wall is deformable so that the side wall is spaced away from the magnet.

9. A key sheet for a pointing device according to claim 6, wherein, in a state in which no depressing operation is being performed on the key top:
   the accommodation recess is in contact with the board.

10. A key sheet for a pointing device according to claim 1, further comprising, as the support member:
    a support plate that is separate from the key top which protrudes with respect to the key top in a sidewise moving direction of the key top and on which the key top is placed, wherein the elastic flexible portion is the support plate.

11. A key sheet for a pointing device according to claim 1, further comprising, as the support member:
    a support plate that is separate from the key top which protrudes with respect to the key top in a sidewise moving direction of the key top and on which the key top is placed, wherein the elastic flexible portion is a tongue portion formed by a through-hole extending through a thickness of the support plate.

12. A key sheet for a pointing device according to claim 1, further comprising:
    an annular blind member on a side of an outer peripheral surface of the key top,
    wherein the blind member is a blind plate which has an insertion hole allowing relative movement of the key top in the depressing direction of the key top and hiding one of the support member and the magnet from outside at a position sidewise with respect to the key top.

13. A key sheet for a pointing device according to claim 12, wherein: the blind plate is not attached to the magnet and is situated so that the blind plate covers an operation surface side of the magnet.

14. A key sheet for a pointing device according to claim 12, wherein: the blind plate is attached to the magnet and is situated so that the blind plate covers an operation surface side of the magnet.

15. A key sheet for a pointing device according to claim 1, wherein:
the magnet is composed of an annular magnet, and wherein a magnetizing direction of the magnet is an inner and outer perimeter direction with respect to an annulus.

16. A key sheet for a pointing device according to claim 1, wherein:
the magnet is composed of a plurality of magnets arranged at circumferential positions, and wherein magnetizing directions of the magnets are inner and outer perimeter directions with respect to a circumference.

17. A key sheet for a pointing device according to claim 1, further comprising:
an outer peripheral key top attached to the support member.

18. A pointing device comprising:
a key sheet for a pointing device according to claim 1; and magnetic sensors.

19. A pointing device according to claim 18, further comprising:
a magnet, wherein the magnet and the magnetic sensors are arranged in a plane parallel to a board.

20. A key sheet for a pointing device according to claim 1, wherein the magnet is spaced away from the board.

21. A pointing device according to claim 18, wherein the magnet sensor is placed on the board so as to encircle the magnet from sidewise direction.

22. A key sheet for a pointing device according to claim 6, wherein the first side wall has a direct contact with the magnet.

23. A key sheet for a pointing device according to claim 6, wherein: the elastic flexible portion further includes a second side wall, and the first and second side walls are substantially perpendicular to the base support member and are directly in contact with the magnet.

24. A key sheet for a pointing device according to claim 1, wherein the second side wall being detached from the magnet in a second state.

* * * * *

UNITED STATES PATENT AND TRADEMARK OFFICE
CERTIFICATE OF CORRECTION

| | |
|---|---|
| PATENT NO. | : 8,072,425 B2 |
| APPLICATION NO. | : 11/441046 |
| DATED | : December 6, 2011 |
| INVENTOR(S) | : Toshinori Takatsuka et al. |

It is certified that error appears in the above-identified patent and that said Letters Patent is hereby corrected as shown below:

Title Page, Item (73) Assignee should be amended as follows:

-- Asahi Kasei EMD Corporation, Tokyo (JP)
Polymatech Co., Ltd., Tokyo (JP) --

Signed and Sealed this
Seventh Day of February, 2012

David J. Kappos
*Director of the United States Patent and Trademark Office*